US012508200B1

(12) United States Patent
Lai

(10) Patent No.: US 12,508,200 B1
(45) Date of Patent: Dec. 30, 2025

(54) OSCILLATING-DRIVE MECHANISM FOR MASSAGER

(71) Applicant: LONGNAN PINXIN MOTOR CO., LTD., Longnan (CN)

(72) Inventor: Guanxi Lai, Longnan (CN)

(73) Assignee: LONGNAN PINXIN MOTOR CO., LTD., Jiangxi (CN)

( * ) Notice: Subject to any disclaimer, the term of this patent is extended or adjusted under 35 U.S.C. 154(b) by 0 days.

(21) Appl. No.: 19/176,218

(22) Filed: Apr. 11, 2025

(30) Foreign Application Priority Data

Jan. 23, 2025 (CN) ........................ 202520162704.2

(51) Int. Cl.
*A61H 23/02* (2006.01)

(52) U.S. Cl.
CPC . *A61H 23/0254* (2013.01); *A61H 2201/0207* (2013.01); *A61H 2201/1481* (2013.01); *A61H 2201/1678* (2013.01)

(58) Field of Classification Search
CPC .................... A61H 23/00; A61H 23/02; A61H 23/0254–0263; A61H 2023/0209; A61H 2023/0272–029; A61H 19/00–50
USPC ........................................................... 601/53
See application file for complete search history.

(56) References Cited

U.S. PATENT DOCUMENTS 5,085,207 A * 2/1992 Fiore .................. A61H 23/0254 601/134
11,389,374 B1 * 7/2022 He ....................... A61H 23/006
12,186,257 B1 * 1/2025 Cun .................... A61H 23/0263
12,268,647 B1 * 4/2025 Wang ...................... A61H 19/44
2018/0161236 A1 * 6/2018 Bailey ..................... A61H 19/44
2019/0247271 A1 * 8/2019 Lee ....................... A61H 23/006
2023/0116215 A1 * 4/2023 Liu ....................... A61H 9/0057 600/38
2025/0073119 A1 * 3/2025 Zhu ..................... A61H 23/0254
2025/0177239 A1 * 6/2025 Huang ............... A61H 23/0254
2025/0195322 A1 * 6/2025 Anderton ............... A61H 19/44

FOREIGN PATENT DOCUMENTS

WO WO-2023175195 A1 * 9/2023 ............. A61H 19/44

* cited by examiner

*Primary Examiner* — Paige Kathleen Bugg

(74) *Attorney, Agent, or Firm* — Ming Jiang; OPENPTO US LLC

(57) ABSTRACT

Disclosed is an oscillating-drive mechanism for a massager, including a support member, an oscillating arm, a transmission member, and a motor; the support member includes a first support portion, which is connected to the oscillating arm and configured to support the oscillating arm to form a plurality of support points, the plurality of support points are arranged about a first rotary shaft, and the oscillating arm is rotatable in any direction about a center defined by the plurality of support points; the transmission member includes a first transmission portion and a second transmission portion; the second transmission portion abuts against the oscillating arm to drive the oscillating arm to move in a rotational direction of the motor; and the oscillating arm maintains an inclined posture relative to the first rotary shaft, and the first rotary shaft forms an angle with an axial direction of the oscillating arm.

19 Claims, 6 Drawing Sheets

OSCILLATING-DRIVE MECHANISM FOR MASSAGER

CROSS-REFERENCE TO RELATED APPLICATIONS

The present application claims priority of Chinese Patent Application No. 202520162704.2, filed on Jan. 23, 2025, and the content of which is incorporated herein by reference in its entirety.

TECHNICAL FIELD

The present disclosure relates to the technical field of massage devices, and particularly relates to an oscillating-drive mechanism for a massager.

BACKGROUND

With the continuous enrichment and improvement of functions of massage devices such as fascia guns and massagers, an innovative massager has come on the market; the massager has a massage head capable of performing continuous rotational and oscillating motion, providing users with more diverse and in-depth massage effects. However, a rotational and oscillating transmission mechanism used by the massager is relatively simple, and suffers from some technical limitations.

As shown in FIG. 1, an axis of the massage head support body is not collinear with a motor output shaft; instead, a certain angle is formed between them. As a result, a motion trajectory of the motor output shaft describes a standard cylindrical shape during rotation, while a motion trajectory of the massage head describes a conical shape. With the transmission structure, an angle of the massage head support body changes synchronously with the rotation of the motor, which places higher demands on the lubrication efficiency between the massage head support body and the flexible layer.

During continuous operation of the massager, repeated compression and friction occur between the massage head support body and an inner wall of the flexible layer. As time goes by, the lubricating oil originally applied to their contact surfaces will gradually become depleted and migrated, and a large amount of lubricating oil will flow to other non-critical areas, which will directly lead to a sharp increase in friction between the massage head support body and the inner wall of the flexible layer, ultimately causing the transmission mechanism to get stuck. Furthermore, it will also result in overload of the motor, affecting the normal operation and service life of the massager.

SUMMARY

In order to solve the above technical problems, the present disclosure provides an oscillating-drive mechanism for a massager, including a support member, an oscillating arm, a transmission member, and a motor;

an axis of an output shaft of the motor is a first rotary axis;

the support member includes a first support portion, the first support portion is connected to the oscillating arm and is configured to support the oscillating arm to form a plurality of support points, the plurality of support points are arranged about the first rotary axis, and the oscillating arm is rotatable in any direction about a center defined by the plurality of support points;

the transmission member includes a first transmission portion and a second transmission portion;

the first transmission portion is connected to the output shaft of the motor, such that the transmission member rotates in unison with the output shaft of the motor;

the second transmission portion abuts against the oscillating arm to drive the oscillating arm to move in a rotational direction of the motor;

the oscillating arm maintains an inclined posture relative to the first rotary axis, and the first rotary axis forms an angle with an axial direction of the oscillating arm; and the second transmission portion rotates relative to the oscillating arm.

Further, a middle section of the oscillating arm in a length direction protrudes in a radial direction to from a second support portion, and a wall surface of the second support portion is a spherical surface;

the first support portion has a spherical hole structure, a wall surface of the spherical hole structure is also a spherical surface, and an axis of the first support portion is coaxial with the first rotary axis; and a spherical center of the second support portion is located on the axis of the first support portion.

Further, the first support portion is made of a flexible material, and the first support portion is connected to a circumferential wall surface of the oscillating arm; and when the oscillating arm is subjected to force, the first support portion is deformed to provide motion clearance for the oscillating arm.

Further, the first support portion is configured as a plate structure and is provided with a circular hole penetrating the plate, and an axis of the circular hole is coaxial with the output shaft of the motor;

a portion of the oscillating arm located in the circular hole is a cylindrical structure;

$$L1 \leq \sqrt{3} \times L2;$$

where L1 is a maximum distance between the circular hole and a circumferential wall surface of the cylindrical structure, and L2 is a depth of the circular hole.

Further, the oscillating arm is divided into three sections in the length direction, the three sections are a first rigid section, an elastic section, and a second rigid section in sequence; and the three sections are aligned in a straight line when the elastic section is in an unstressed state; and when the first rigid section and the second rigid section are subjected to force exceeding a predetermined resistance, the elastic section is deformed to cause the oscillating arm to bend.

Further, a third transmission portion is arranged at an end of the oscillating arm, and the second transmission portion applies force to the third transmission portion in the rotational direction of the motor; and the second transmission portion also applies force to the third transmission portion in a direction perpendicular to and away from the first rotary axis.

Further, the transmission member also includes a first mounting plate, and the first mounting plate is configured to fixedly connect the first transmission portion and the second transmission portion.

Further, the third transmission portion is configured as a circular hole formed from the end of the oscillating arm in the length direction of the oscillating arm;

the second transmission portion is a shaft structure protruding from the first mounting plate, and an axis of the second transmission portion is not coaxial with the first rotary axis; and the second transmission portion is inserted into the third transmission portion and abuts against a circumferential wall surface of the third transmission portion, such that the length direction of the oscillating arm is not parallel to the output shaft of the motor.

Further, the third transmission portion is configured as a cylindrical body extending from the end of the oscillating arm in the length direction of the oscillating arm;

the second transmission portion is configured as a circular hole structure recessed in the first mounting plate, and an axis of the second transmission portion is parallel to but not coaxial with the first rotary axis; and the third transmission portion is arranged obliquely in the second transmission portion relative to the axis of the second transmission portion.

Further, the second transmission portion is configured as a slot structure;

the slot has at least two wall surfaces forming an opening oriented in a direction away from the first rotary axis;

the third transmission portion is configured as a cylindrical body extending from the end of the oscillating arm in the length direction of the oscillating arm; and the third transmission portion is arranged at the opening of the slot, and the wall surfaces of the slot drive the third transmission portion to rotate about the first rotary axis, thereby causing the length direction of the oscillating arm to be non-parallel to the output shaft of the motor.

Further, a ball bearing structure is arranged between the third transmission portion and the second transmission portion to generate rolling friction between the third transmission portion and the second transmission portion.

Further, the ball bearing structure is a sphere, and the sphere replaces the second transmission portion to abut against the oscillating arm.

Further, the ball bearing structure is a bearing, and the bearing replaces the second transmission portion to abut against the oscillating arm.

Further, the support member is configured as a cylindrical structure, a first guide hole is formed on an inner wall of the support member, and an axis of the first guide hole is parallel to the axis of the output shaft of the motor;

the first mounting plate is circular, and an axis of the first transmission member is coaxial with the first mounting plate; and the first mounting plate is rotatably connected in the first guide hole.

Further, the oscillating arm is provided with a limiting portion protruding in a circumferential direction of the oscillating arm, the oscillating arm is mounted through the second support portion, and the second support portion is positioned between the limiting portion and the support points.

Further, the second support portion is detachably connected to the oscillating arm; and the second support portion is an annular structure, and an outer annular sidewall of the second support portion is a spherical surface.

Further, a rear end face of the support member is configured as a second mounting plate, and the second mounting plate is detachably fixed to a main body of the support member.

Further, a front end of the oscillating arm is configured as a support body for supporting a flexible layer, and a functional module is arranged inside the support body.

Further, the functional module has a vibration function and/or a heating function.

Further, the motor is connected to a reduction gearbox.

The present disclosure has the following beneficial effects: the present disclosure transfers friction generated from relative rotation between the support body and the flexible layer to the second transmission portion and the oscillating arm. Both the second transmission portion and the oscillating arm can be configured as a metal member or a plastic member, and a contact area between them is much smaller than a contact area between the support body and the flexible layer. Therefore, the friction force is very small, effectively preventing the motor from overloading, and improving the stability and lifespan of the device.

Figure 1:
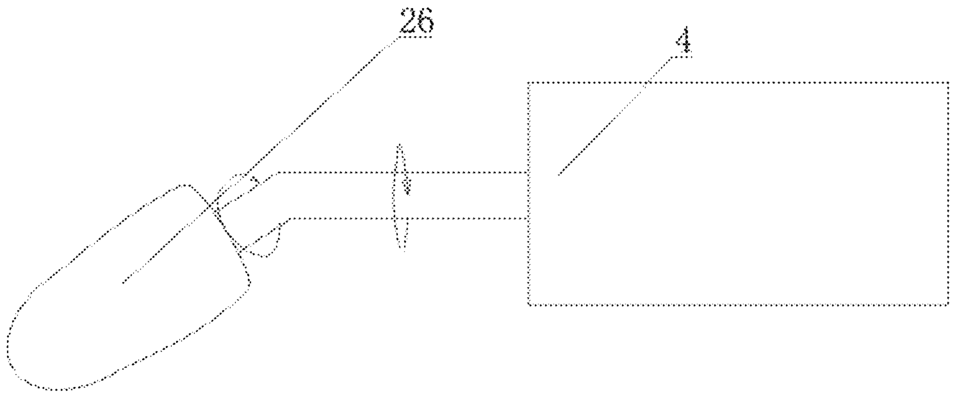
FIG. 1 (Prior Art)
FIG. 1 is a structural schematic diagram of an oscillating-drive mechanism for a massager in the prior art.

Reference numerals in the accompanying drawings: 1. support member; 11. first support portion; 12. second mounting plate; 13. first guide hole; 2. oscillating arm; 21. third transmission portion; 22. second support portion; 23. first rigid section; 24. elastic section; 25. second rigid section; 26. support body; 27. limiting portion; 3. transmission member; 31. first transmission portion; 32. second transmission portion; 33. first mounting plate; 34. ball bearing structure; 4. motor; 41. output shaft; 5. functional module; 6. first rotary axis; and 7. support point.

DETAILED DESCRIPTIONS OF THE EMBODIMENTS

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. All the other embodiments obtained by those of ordinary skill in the art based on the embodiments in the present disclosure without creative efforts shall fall within the scope of protection of the present disclosure.

Embodiment 1

With reference to FIGS. 1-10,

An oscillating-drive mechanism for a massager, including a support member 1, an oscillating arm 2, a transmission member 3, and a motor 4;

- an axis of an output shaft 41 of the motor 4 is a first rotary axis 6;
- the support member 1 includes a first support portion 11, the first support portion 11 is connected to the oscillating arm and is configured to support the oscillating arm 2 to form a plurality of support points 7, the plurality of support points 7 are arranged about the first rotary axis 6, and the oscillating arm 2 is rotatable in any direction about a center defined by the plurality of support points 7;
- the transmission member 3 includes a first transmission portion 31 and a second transmission portion 32;
- the first transmission portion 31 is connected to the output shaft 41 of the motor 4, such that the transmission member 3 rotates in unison with the output shaft 41 of the motor 4; and
- the second transmission portion 32 abuts against the oscillating arm 2 to drive the oscillating arm 2 to move in a rotational direction of the motor 4;
- the oscillating arm 2 maintains an inclined posture relative to the first rotary axis 6, and the first rotary axis 6 forms an angle with an axial direction of the oscillating arm 2; and
- the second transmission portion 32 rotates relative to the oscillating arm 2.

Abutting force exerted in a rotational direction of the output shaft 41 of the motor 4 drives the oscillating arm 2 to rotate about the first rotary axis 6; the second transmission portion 32 is not fixedly connected to the oscillating arm 2, but they can perform relative motion; the term "relative motion" does not refer to a rotatable connection between the second transmission portion 32 and the oscillating arm 2. In fact, the oscillating arm 2 is a cylindrical rod. During rotation of the second transmission portion 32, the second transmission portion 32 abuts against a circumferential wall surface of the cylindrical rod, the oscillating arm 2 itself does not rotate about its own axis; and the second transmission portion 32 abuts against the circumferential wall surface of the cylindrical rod in sequence, which makes the implementation very simple, as it only requires that the second transmission portion and the oscillating arm are not fixedly connected. Under abutting force exerted in the radial direction of output shaft 41 of the motor 4, the oscillating arm 2 is arranged obliquely relative to the first rotary axis 6, such that an included angle is formed between the axial direction of the oscillating arm 2 and the first rotary axis 6, and a trajectory of the oscillating arm 2 during the motion forms two conical shapes with a center of the support points 7 as an apex.

The motor 4 is specifically a geared motor 4, including a drive unit and a reduction gearbox, such that the motor 4 drive the oscillating arm 2 to move at a suitable speed.

With reference to FIG. 1, the massage apparatus currently available on the market is provided with a massage head that performs conical motion. "Conical motion" refers to an axis of the massage head forming a cone. At present, a drive mechanism of the massage apparatus is very simple, where the output shaft 41 of the motor 4 is directly connected to a support body 26 of the massage head, an axis of the support body 26 forms an angle with the first rotary axis 6, an extension line of the output shaft 41 of the motor 4 and the axis of the support body 26 form a triangular vector plane, and the output shaft 41 of the motor 4 drives the vector plane to rotate to form a conical trajectory. The transmission structure in the prior art seems faultless when observed alone, however, the support body 26 must be encased in a silicone layer that serves as a flexible layer to make the massage more comfortable, provide water resistance for the massage head to facilitate cleaning. In this case, the transmission mechanism of the massage apparatus that is provided with the flexible layer in the prior art will interfere with the flexible layer. In the prior art, the support body 26 of the transmission mechanism not only performs conical motion, but also rotates about its own axis; when the output shaft 41 of the motor 4 rotates, an object that is fixedly connected to the output shaft 41 of the motor 4 will be inevitably rotated. Moreover, Since the flexible layer is an integrated part that completely wraps the massage head in all directions, and needs to be gripped, the flexible layers cannot be allowed to rotate. Therefore, an only solution is to implement a rotational connection between the flexible layer and the support body 26, and the friction between the flexible layer and the support body 26 must be minimized. At present, a main solution to minimize the friction is to apply lubricating oil to a contact surface between the flexible layer and the support body 26. However, since silicone is a flexible material, an inner wall surface of the flexible layer is prone to deformation during continuous motion of the support body 26, the lubricating oil tends to migrate to other non-critical parts due to changes in pressure, resulting in a gradual decrease in the lubricating oil on the contact surface between the flexible layer and the support body 26. In addition, the lubricating oil will gradually evaporate over time. When the lubricating oil on the contact surface between the flexible layer and the support body 26 is insufficient, resistance to the rotation of the support body 26 increases greatly. The support body 26 will drive the flexible layer to rotate through friction force, leading to deformation and squeezing of the flexible layer, thereby causing the motor 4 to overload or a connection between the support body 26 and the output shaft 41 of the motor 4 to fracture.

Therefore, the present disclosure provides a novel drive mechanism that enables the support body 26 to perform conical motion.

The drive mechanism includes a support member 1 and an oscillating arm 2, and a first support portion 11 is arranged at a front end of the support member 1. A front end of the oscillating arm 2 can directly serve as the support body 26 of the massage head, and a middle section of the oscillating arm 2 is provided with the first support portion 11; a rear end inside the support member 1 is provided with a transmission member 3, the transmission member 3 includes at least a first transmission portion 31 and a second transmission portion 32, and the first transmission portion 31 is connected to the output shaft 41 of the motor 4; and the second transmission portion 32 is arranged eccentrically relative to the first transmission portion 31, and the second transmission portion 32 abuts against the oscillating arm 2 in the rotational direction; and

- the first support portion 11 is rotatably connected to the oscillating arm 2, and a rotatable connection can be achieved simply by providing a circular ring in a center of the first support portion 11, and the circular ring being sleeved on the oscillating arm 2, which does not limit a freedom of oscillation of the oscillating arm 2, and the oscillating arm 2 can oscillate in any direction, that is, 360 degrees. A plurality of support points 7 are formed on the first support portion 11, and the plurality of support points 7 are arranged in a circular array about the first rotary axis 6. For example, when the first support portion 11 is a hole structure, an opening edge of the hole can be served as the support points 7, and the hole of the first support portion 11 is coaxial with the motor 4; when the first support portion 11 is a flexible structure, the first support portion 11 is directly and fixedly connected to the oscillating arm 2. When in motion, the oscillating arm 2 inevitably causes the flexible first support portion 11 to deform, and form a maximum deformation range, and an edge of the maximum deformation range is arranged about the first rotary axis 6.

A method that the transmission member 3 abuts against the oscillating arm 2 can be specifically set as follows:

an end of the oscillating arm 2 serves as the third transmission portion 21, the transmission member 3 can be designed as a disc (or any shape, but a circular structure is simple), two holes are formed in the disc, one of the holes is positioned at an axis of the disc as the first transmission portion 31, and the other hole offsets from a center as the second transmission portion 32. The end of the oscillating arm 2, that is, the third transmission portion 21, is directly inserted into the second transmission portion 32 in the form of a cylindrical body.

Alternatively, the transmission member 3 can be configured as a Z-shaped cylindrical body, one of two parallel arms is connected to the output shaft 41 of the motor 4 as the first transmission portion 31, and the other parallel arm serves as the second transmission portion 32; and a hole is formed on the end of the oscillating arm 2 as the third transmission portion 21 to be sleeved on the second transmission portion 32. Similar hole-and-shaft structure may also be used as the structural forms of the first transmission portion 31, the second transmission portion 32, and the third transmission portion 21.

Alternatively, the transmission member 3 can be configured as a slot structure, such as a V-shaped slot or a C-shaped slot, and an opening of the C-shaped slot faces a direction away from the first rotary axis 6; and the third transmission portion 21 is designed as a cylindrical structure. Taking the V-shaped slot as an example, the third transmission portion 21 is inserted into an opening of the V-shaped slot. An intersection position of the V-shaped slot prevents the third transmission portion 21 from swinging toward the first rotary axis 6, thereby preventing the oscillating arm 2 from being parallel to the first rotary axis 6. Even when a length direction of the oscillating arm 2 forms a fixed angle with the output shaft 41 of the motor 4, the motor drives the entire V-shaped slot to rotate, and a wall surface of the opening formed by V-shaped slot drives the third transmission portion 21 to rotate about the first rotary axis 6.

For the above connection configurations, the second transmission portion 32 and the third transmission portion 21 are not connected, that is, the second transmission portion and the third transmission portion do not rotate synchronously ("rotate" refers to a rotation about their respective axes). The second transmission portion 32 rotates with the first transmission portion 31, but friction force between the second transmission portion 32 and the third transmission portion 21 is very small, so the third transmission portion 21 (and the entire oscillating arm 2) will not rotate, such that the flexible layer can oscillate synchronously with the support body 26 without requiring relative rotation. A conical trajectory formed by the motion of the oscillating arm 2 is not generated by rotation but rather by the second transmission portion 32 continuously driving the oscillating arm 2 to oscillate in arc at different angles.

Various specific structures of the first support portion 11 are provided in this embodiment.

1. The first support portion 11 may be configured as a cover plate made of a flexible material (such as rubber, and silicone), the first support portion 11 is connected to the front end of the support member 1, and the oscillating arm 2 passes through the first support portion 11. In this configuration, the edge of the hole through which the oscillating arm 2 passes in the first support portion 11 serves as the support points 7, the oscillating arm 2 presses against the support points 7, and first support portion 11 deforms to accommodate the oscillation motion of the oscillating arm 2. The oscillating arm 2 may be directly bonded to the first support portion 11, or may protrude in a radial direction of the oscillating arm 2 to form two limiting portions 27, and the first support portion 11 is positioned between the two limiting portions 27, and the limiting portions 27 prevent the oscillating arm 2 and the first support portion 11 from sliding.
2. Further, the first support portion 11 may be further simplified into a plurality of flexible strips, such as four rubber strips, and the four rubber strips are arranged in a cross shape. One end of each of the rubber strips is connected to the support member 1, and the other end thereof is connected to a sidewall of the oscillating arm 2. When the oscillating arm 2 oscillates toward one of the rubber strips, connection positions between an opposite rubber strip and the oscillating arm serves as the support points 7 for the oscillation of the oscillating arm, and the front end and the rear end of the oscillating arm 2 oscillate in opposite directions.
3. Alternatively, the first support portion 11 may be configured as a thin plate that is hard to deform, a hole is formed on the thin plate, an axis of the hole is coaxial with the first rotary axis 6. A depth of the hole in the thin plate is very short. Normally, a hole with a certain depth provides support at both ends, such that a straight line is formed between two points, causing the cylindrical body to be unable to oscillate. However, the hole in the thin plate is very shallow, two ends of the hole is very close, so the two original supports are combined into one, a straight line passing through a single support point 7 rotates freely at 360 degrees. The shallow hole does not limit the oscillation freedom of the cylindrical body, so the oscillating arm 2 can still oscillate freely in the hole of the first support portion 11. In addition, the limiting portions 27 need to be arranged in a circumferential direction of the oscillating arm 2 to prevent the oscillating arm 2 from sliding. Specifically, a maximum distance between the circular hole and a circumferential wall surface of the third transmission portion 21 is L1; a thickness of the thin plate (that is, the depth of the circular hole) is L2; and a relationship between L1 and L2 satisfies $L1 \leq \sqrt{3} \times L2$. In fact, L1 and L2 correspond to two perpendicular sides of a right triangle. When L1 equals to $\sqrt{3} \times L2$, the oscillating arm 2 can form an angle of 30 degrees with the first rotary axis 6; and the smaller the L1 is, the smaller the angle that can be formed.

The present disclosure transfers friction generated from relative rotation between the support body 26 and the flexible layer to an interface between the second transmission portion 32 and the third transmission portion 21. Both the third transmission portion 21 and the second transmission portion 32 can be configured as a metal member or a plastic member, and a contact area between them is much smaller than a contact area between the support body 26 and the flexible layer. Therefore, the friction force is very small, effectively preventing the motor 4 from overloading, and improving the stability and lifespan of the device.

Further, rolling friction may be configured between the second transmission portion 32 and the third transmission portion 21, for example, a ball bearing structure 34 may be arranged. A ball may be embedded in a circumferential wall of the second transmission portion 32, such that the sliding friction between the second transmission portion 32 and the third transmission portion 21 is converted into rolling friction, further reducing resistance. The ball bearing structure 34 may be configured as a bearing. For example, the second transmission portion 32 serves as a shaft, the third transmission portion 21 serves as a hole, the bearing can be either sleeved on a periphery of the second transmission portion 32 or embedded in the third transmission portion 21. Alternatively, the ball bearing structure 34 may be configured as an individual ball element, this configuration is simpler in structure, but it is no longer is a standard part. The ball bearing structure 34 in the form of the ball element can be embedded in the second transmission portion 32, and the ball elements abut against an inner wall of the third transmission portion 21.

The front end of the oscillating arm 2 is configured as a support body 26 for supporting a flexible layer, and a functional module 5 is arranged inside the support body 26. The massage heads of most massage devices have vibration and heating functions. In this embodiment, the functional module 5 inside the support body 26 is configured to achieve vibration and heating functions. Since the support body 26 of the present disclosure no longer generates relative motion with respect to the flexible layer, the flexible layer can be completely adhered to the support body 26, such that the vibration and heat generated by the functional module 5 can be effectively transmitted to an outer surface of the flexible layer, thereby improving the massage effect of the massage device.

Embodiment 2

Figure 2:
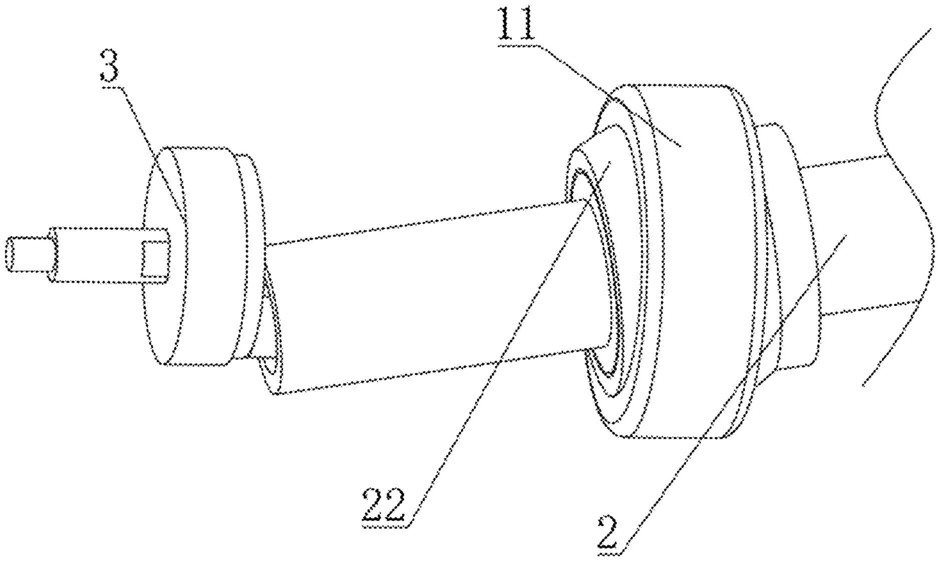
FIG. 2 is a schematic diagram of a three-dimensional structure of an oscillating-drive mechanism for a massager according to the present disclosure.
Figure 3:
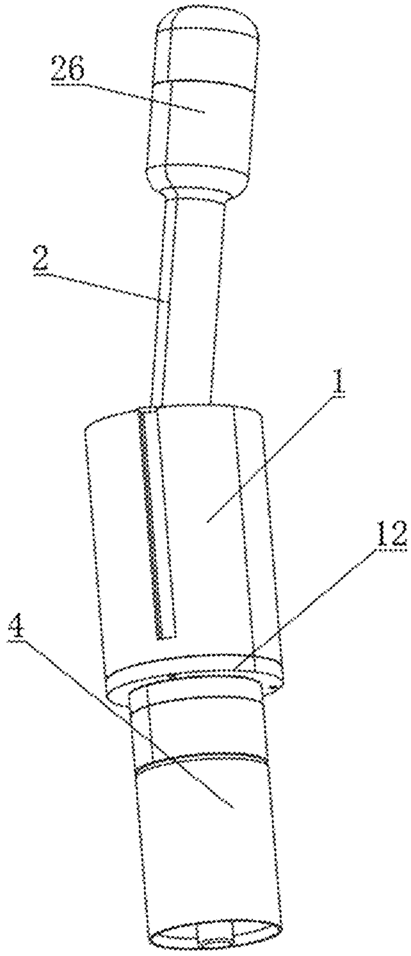
FIG. 3 is a schematic diagram of a three-dimensional structure of an oscillating-drive mechanism for a massager with a first support portion in a form of a spherical structure according to the present disclosure.
Figure 4:
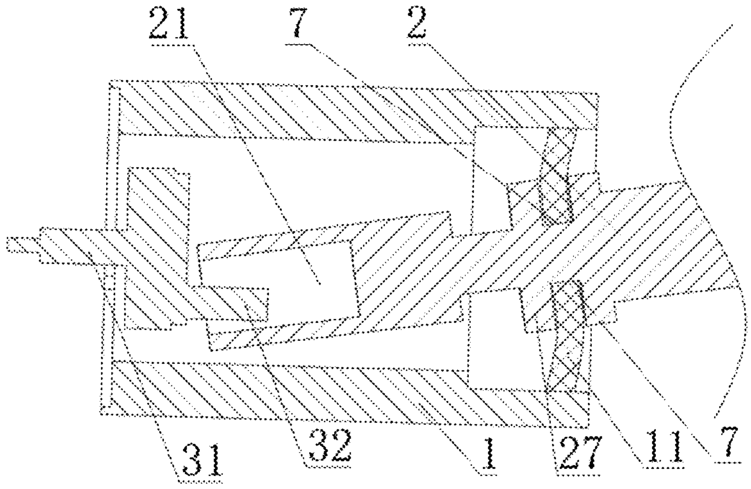
FIG. 4 is a structural schematic diagram of one form of a first support portion of an oscillating-drive mechanism for a massager (the first support portion is in a form of a flexible structure) according to the present disclosure.
Figure 5:
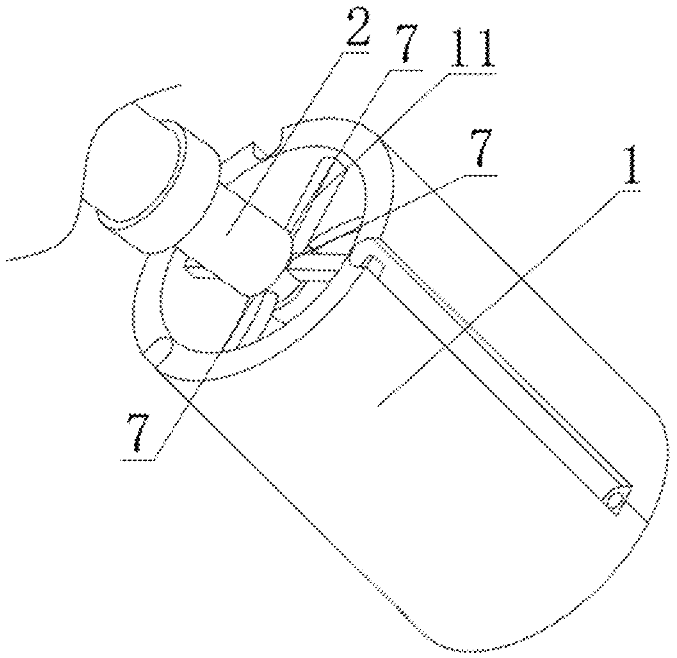
FIG. 5 is a structural schematic diagram of another form of a first support portion of an oscillating-drive mechanism for a massager (the first support portion is in a form of a rubber strip) according to the present disclosure.
Figure 6:
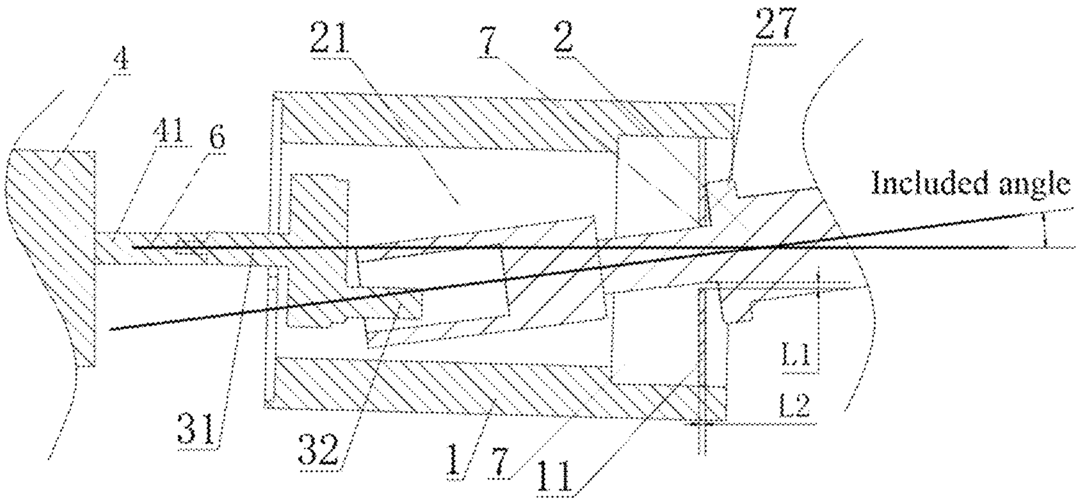
FIG. 6 is a structural schematic diagram of yet another form of a first support portion of an oscillating-drive mechanism for a massager (the first support portion is in a form of a thin plate structure) according to the present disclosure.
Figure 7:
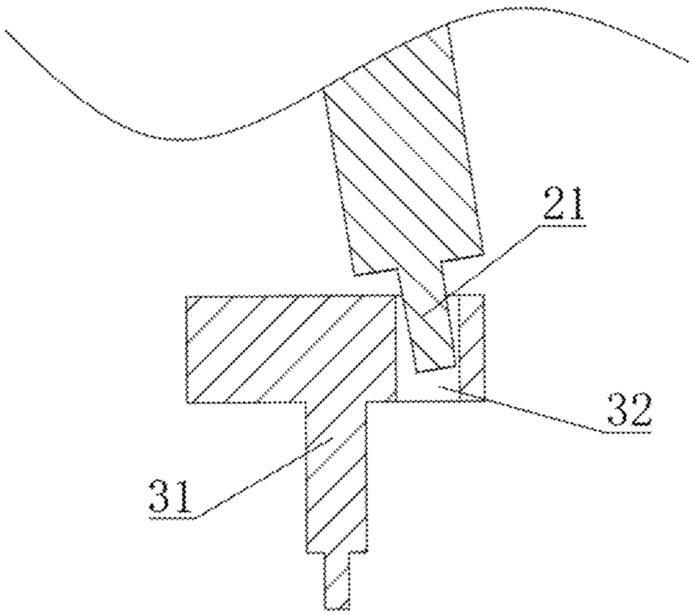
FIG. 7 is a schematic diagram of a connection between a transmission member in a form of a hole shaft and a third transmission portion according to the present disclosure.
Figure 8:
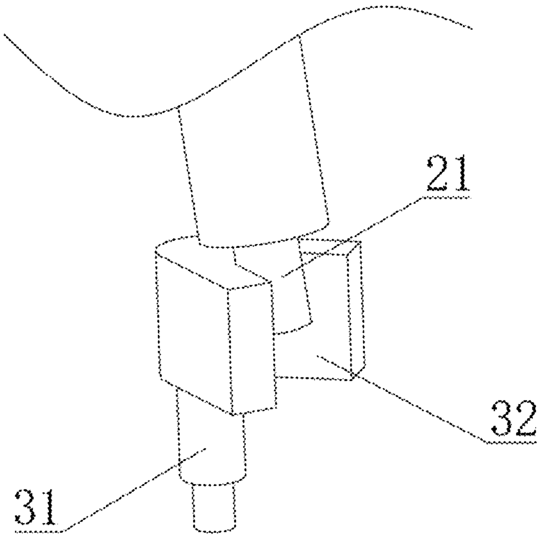
FIG. 8 is a schematic diagram of a connection between a transmission member in a form of a groove and a third transmission portion according to the present disclosure.

With reference to FIG. 2 and FIG. 7.

A middle section of the oscillating arm 2 in a length direction protrudes in a radial direction to from a second support portion 22, and a wall surface of the second support portion 22 is a spherical surface;

- the first support portion 11 has a hole structure, a wall surface of the hole structure is also a spherical surface, and an axis of the first support portion 11 is coaxial with the first rotary axis 6; and
- a spherical center of the second support portion 22 is located on the axis of the first support portion 11.

Embodiment 1 provides a structure of the first support portion 11 using a flexible plate surface, this embodiment discloses a fourth structure of the first support portion 11, which is more preferable.

In the flexible plate-surfaced structure of the first support portion 11, the oscillating arm 2 continuously presses against the first support portion 11 during the motion process, and the first support portion 11 serves as a pivot point for the oscillation of the oscillating arm 2, and has a certain strength, therefore, to squeeze the first support portion 11 and cause it to deform, the oscillating arm 2 needs to impose relatively great force, the force is provided by the motor 4, therefore, the motor 4 needs to generate a higher power, which will in turn greatly shorten a battery life of the drive mechanism Further, constant compression of the flexible material tends to cause cracking at a bonding point of the support member 1, the oscillating arm 2, and the first support portion 11, resulting in failure of the first support portion 11. Therefore, a highly reliable adhesive is needed to ensure the service life of the device.

When the first support portion 11 is configured as a thin plate that is hard to deform, the motion becomes unstable and tends to produce obvious noise.

Therefore, this embodiment provides a more stable and reliable structure for the first support portion 11.

In this embodiment, the first support portion 11 is configured as a spherical hole, the second support portion 22 protrudes from the oscillating arm 2 in a radial direction of the oscillating arm 2, a wall surface of the second support portion 22 is spherical, the second support portion 22 is arranged in the first support portion 11, similar to a ball-joint-type universal joint, such that the second support portion and the first support portion form a spherical fit, with a center of the spherical surface of the first support portion 11 as a rotation center. For the hole-axis fit, the hole and the axis must be coaxial, and a direction of the hole determines a direction of the axis. For the spherical fit, the oscillating arm 2 can rotate about a spherical center, such that the oscillating arm 2 can perform rotation motion about the first rotary axis 6, without being parallel to the first rotary axis 6.

Further, in this embodiment, both the first support portion 11 and the second support portion 22 can be made of metal material or plastic material. Since the first support portion 11 and the second support portion 22 cannot be significantly compressed, friction force between two smooth surfaces of the first support portion and the second support portion during motion is very small, and will not greatly increase the load of the motor 4.

Embodiment 3

Figure 10:
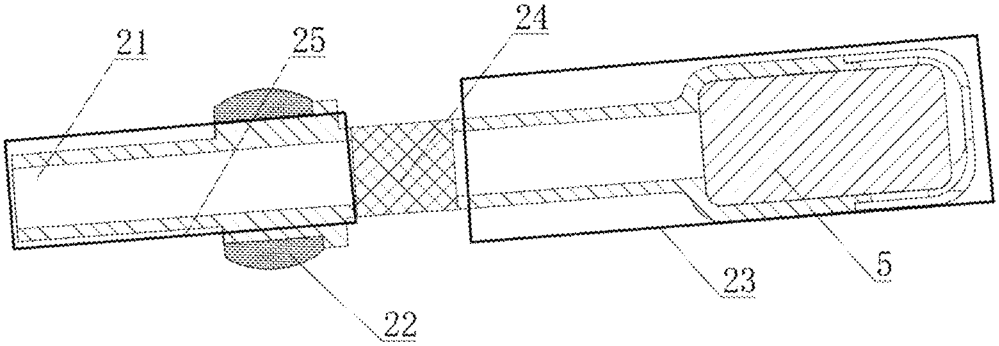
FIG. 10 is a sectional structural schematic diagram of an oscillating arm according to the present disclosure.

With reference to FIG. 10.

The oscillating arm 2 is divided into three sections in the length direction, the three sections is arranged in sequence: a first rigid section 23, an elastic section 24, and a second rigid section 25. In an unstressed state of the elastic section 24, the three sections are aligned in a straight line;

- and when the first rigid section 23 and the second rigid section 25 are subjected to force exceeding a predetermined resistance, the elastic section 24 is deformed.

The structure of the present disclosure can prevent the motor 4 from being overloaded due to excessive friction between the support body 26 and the flexible layer when the massage device operates, and overloading of the motor is one of the main causes for shortening service life of the massage device with the motion mode. Further, there are similar causes that make the motor 4 overload of the massage device. Specifically, an end of the massage head does not rotate about its own axis, but rather about the first rotary axis 6, so a rotational trajectory of the massage head is much larger than its own diameter. For a rotating shaft driven by the motor 4, the larger a diameter is, the greater a resistance of the output shaft 41 when subjected to friction becomes, as a resistance moment arm is equal to a radius of the rotating shaft when an outer contour of the rotating shaft is subject to the force. Therefore, for the massage head rotating about its own axis, a length of the resistance moment arm is a radius of the massage head. In contrast, for a massage head performing the conical motion, a length of the resistance moment arm is a radius of the motion trajectory. In general, a radius of the motion trajectory of the massage device is 2-4 times the diameter of the massage head, such that a user can have good and sufficient massage effect, which, however, will increase a load on the motor 4 by 2-4 times. When the user presses the massage head firmly against his/her body, the motor 4 is very easy to reach an overload state. Although a degree of overload varies depending on a pressure applied by the user, long-term and frequent overloading of the motor 4 will affect the service life of the motor 4, thus shortening the service life of the massage device.

In order to solve the above problem, in this embodiment, the oscillating arm 2 serves as a frame of oscillating motion of the massage head, the elastic section 24 is arranged in a middle section of the massage head in the length direction of the oscillating arm 2. The elastic section 24 must not be overly soft and is at least capable of providing support during the oscillating motion of the massage head without significant deformation, and is capable of effectively transferring the force received by third transmission portion 21 to the support body 26. The elastic section 24 may be made of a relatively hard rubber, a spring, an elastic plastic material, and the like. A maximum resistance that the elastic section 24 can withstand in a non-deformed state is a predetermined resistance. When the resistance applied to the elastic section 24 exceeds the predetermined resistance, the elastic section 24 is deformed.

When the massager operates normally, and a resistance of the oscillating arm 2 is less than the predetermined resistance, the elastic section 24 is not deformed. However, when the massage head is subjected to a greater resistance, for example, the massage head is pressed firmly against a palm, in this case, the force of the massage head pressing against the palm acts as a resistance to motion of the mechanism, and the resistance is sufficient to cause the elastic section 24 to deform, the first rigid section 23, together with the support body 26 and the flexible layer, remains in contact with the palm and keeps motionless, while the second transmission portion 32 continues to drive the third transmission portion 21, such that the second rigid section 25 keeps motion, that is, the deformation of the elastic section 24 enables the second rigid section 25 (the third transmission portion 21) to move independently from the first rigid section 23, thereby accommodating the motion of the second transmission portion 32 to ensure that the load on the motor 4 from will not increase infinitely, thereby avoiding overload of the motor 4 and extending the service life of the massage device.

Embodiment 4

Figure 9:
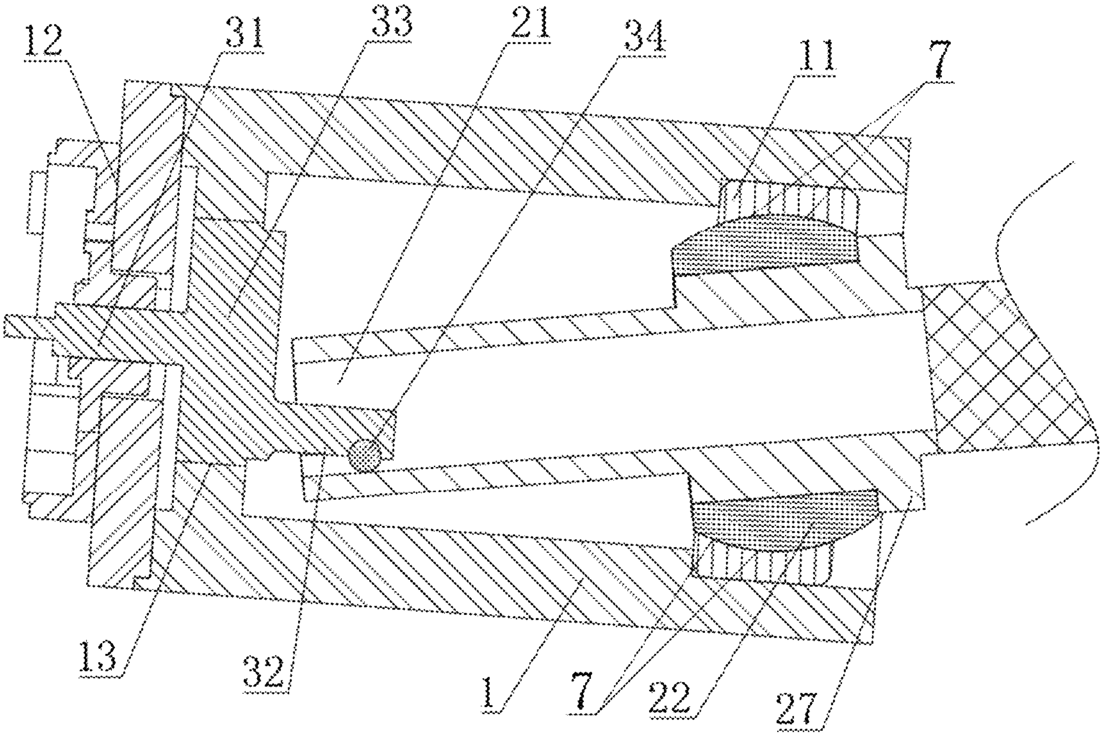
FIG. 9 is a sectional structural schematic diagram of an oscillating-drive mechanism for a massager with a spherical first support portion according to the present disclosure.

With reference to FIG. 9.

The support member 1 is configured as a cylindrical structure, a first guide hole 13 is formed in the support member 1, and an axis of the first guide hole 13 is parallel to an axis of the output shaft 41 of the motor 4;

a first mounting plate 33 is circular, and an axis of the first transmission member 31 is coaxial with the first mounting plate 33; and the first mounting plate 33 is arranged in the first guide hole 13.

A first guide hole 13 is formed in the support member 1 (a second mounting plate 12 serves as a part of the support member 1, and the first guide hole 13 is also formed on the second mounting plate 12, accordingly the support member 1 is provided with the first guide hole 13), the first guide hole 13 is sleeved over the first mounting plate 33, the first mounting plate 33 is configured as a circular plate, and the first transmission member 31 is arranged on the first mounting plate 33, it can be understood that a diameter of the first mounting plate 33 should be greater than a diameter of the motion trajectory of the second transmission member 32.

The first mounting plate 33 is rotatably connected to the first guide hole 13, corresponding to the configuration where the first transmission portion 31 is rotatably connected to the first guide hole 13. The first mounting plate 33 and the first transmission portion 31 can be viewed as two shafts with different diameters, the first mounting plate 33 has a larger diameter, with the larger diameter, a mass distribution thereof is farther from the rotation center, such that rotational inertia is significantly increased. Since the second transmission part 32 is eccentric to the first rotary axis 6, eccentric motion will periodically apply lateral force and torque. The larger diameter the shaft, the greater rotational inertia applies, and the periodic torque can be absorbed better, such that speed fluctuations are reduced, and the transmission member 3 can rotate more stably as a whole, Embodiment 5

With reference to FIGS. 2 and 9.

The second support portion 22 is detachably connected to the oscillating arm 2; and the second support portion 22 is an annular structure, an outer annular sidewall of the second support portion 22 is a spherical surface, and an inner ring wall surface is a cylindrical surface.

The second support portion 22 and the oscillating arm 2 are arranged in a separated manner. Since the first support portion 11 and the second support portion 22 are in spherical joint, spherical centers of the first support portion and the second support portion must coincide. For a sphere, a cross-sectional diameter passing through a spherical center is a largest. The spherical center of the first support portion 11 is located in a depth position of a middle of the hole structure, that is, diameters at both ends of the hole are smaller than a diameter of the depth position of the middle of the hole structure. As a result, it is difficult for the second support portion 22 to pass its cross-section of the spherical center through an opening of the first support portion 11.

Therefore, in this embodiment, the second support portion 22 is configured as an independent annular component. A center of the annular structure does not receive the support from the oscillating arm 2, making it more prone to deformation. In addition, the second support portion 22 can form a cross-shaped intersection with the first support portion 11. The annular structure is easily compressed into an ellipse, a short axis of the ellipse formed by compression is shorter than a diameter of the annular structure, allowing it to be more easily inserted into the first support portion 11. Once being inserted into the first support portion 11, the second support portion 22 can freely rotate about its spherical center, in this case, the oscillating arm 2 can be inserted into an inner ring surface of the second support portion 22. Preferably, the inner ring surface is a circular shape, as the circular shape can distribute the pressure stress from a radial direction more evenly. In contrast, when a square is subject to pressure, the stress will be concentrated at right angle positions, and a diagonal of the square is a longest, and a thickness of outer sidewall of the corresponding diagonal is a thinnest, making it more susceptible to deformation and breaking. The oscillating arm 2 is provided with a protruding limiting portion 27 in a circumferential direction of the oscillating arm, the oscillating arm 2 extends through the second support portion 22, and the second support portion 22 is positioned between the limiting portion 27 and the support points 7.

Further, the first support portion 11 may also be configured as an independent part. When the product is assembled, the first support portion 11 and the second support portion 22 are first connected, and then the oscillating arm 2 and the support member 1 are connected.

In addition, a rear end face of the support member 1 is configured as a second mounting plate 12, and the second mounting plate 12 is detachably fixed to a main body of the support member 1.

When an entire conical rotary mechanism is assembled, a first set of spared parts is assembled, specifically, the first support portion 11 is sleeved on the second support portion 22, the oscillating arm 2 is then inserted into the second support portion 22, and the support member 1 is finally connected to the first support portion 11. Further, the second set of spare parts is assembled, specifically, the transmission member 3 is connected to the second mounting plate 12, the first transmission member 31 is then connected to the output shaft 41 of motor 4, and the first set of spare parts is finally connected to the second set of spare parts.

In the description of the embodiments of the present disclosure, it should be understood that orientations or positional relationships indicated by the terms "up," "down," "front," "rear," "left," "right," "vertical," "horizontal," "center," "top," "bottom," "top side," "bottom side," "inner," "outer", "inner side," "outer side," etc. are based on the orientations or positional relationships shown in the accompanying drawings and are merely for facilitating the description of the present disclosure and simplifying the description, rather than indicating or implying that a device or an element referred to must have a particular orientation or be constructed and operated in a particular orientation, and thus will not be interpreted as limiting the present disclosure. Specifically, "inner side" refers to an internal or enclosed area or space. "Outer side" refers to an area surrounding a specific component or region.

In the description of embodiments the present disclosure, the terms "first", "second", "third" and "fourth" are used for descriptive purposes only, and cannot be construed as indicating or implying relative importance or implicitly indicating the number of technical features indicated. Thus, features defined by "first", "second", "third" and "fourth" may explicitly or implicitly include one or more of the features. In the description of the present disclosure, "plurality of" means two or more, unless otherwise specified.

In the description of the embodiments of the present disclosure, it should be noted that, unless otherwise explicitly specified and defined, the terms "mounting", "connecting", "connection" and "assembly" should be understood in a broad sense, for example, they may be a fixed connection, a detachable connection, or an integrated connection; and may be a direct connection, or an indirect connection via an intermediate medium, or communication inside two elements. For those of ordinarily skilled in the art, specific meanings of the above terms in the present disclosure could be understood according to specific circumstances.

In the description of the embodiments of the present disclosure, specific feature, structure, material or characteristics described may be combined in a suitable manner in any one or more embodiments or examples.

In the description of the embodiments of the present disclosure, it should be understood that that "-" and "~" represent the same range of two numerical values, and the range includes end values thereof, for example, "A-B" means a range greater than or equaling to A and less than or equaling to B. "A-B" means a range greater than or equaling to A and less than or equaling to B.

In the description of the embodiments of the present disclosure, the term "and/or" represents merely an association relationship describing associated objects, indicating that there may be three types of relationships, for example, A and/or B, which means three types of situation, that is, the existence of A alone, the existence of both A and B, and the existence of B alone. In addition, the character "/" herein generally indicates that the associated objects are in an "or" relationship.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What is claimed is:

1. An oscillating-drive mechanism for a massager, comprising:

a support member, an oscillating arm, a transmission member, and a motor; wherein an axis of an output shaft of the motor is defined as a first rotary axis;

the support member comprises a first support portion, wherein the first support portion is connected to the oscillating arm and is configured to support the oscillating arm to form a plurality of support points, the plurality of support points are arranged about the first rotary axis, and the oscillating arm is rotatable in any direction about a center defined by the plurality of support points;

the transmission member comprises a first transmission portion and a second transmission portion; wherein the first transmission portion is connected to the output shaft of the motor, and the transmission member rotates in unison with the output shaft of the motor;

the second transmission portion abuts against the oscillating arm to drive the oscillating arm to move in a rotational direction of the motor, and an axis of the second transmission portion is not coaxial with the first rotary axis; wherein the oscillating arm maintains an inclined posture relative to the first rotary axis, and the first rotary axis forms an angle with an axial direction of the oscillating arm;

the second transmission portion rotates relative to the oscillating arm;

wherein a third transmission portion is arranged at an end of the oscillating arm, and the second transmission portion applies force to the third transmission portion in the rotational direction of the motor; and the second transmission portion applies force to the third transmission portion in a direction perpendicular to and away from a direction of the first rotary axis.

2. The oscillating-drive mechanism for the massager according to claim 1, wherein a middle section of the oscillating arm in a length direction protrudes in a radial direction to form a second support portion, and a wall surface of the second support portion is a spherical surface;

the first support portion has a spherical hole structure, a wall surface of the spherical hole structure is a spherical surface, and an axis of the first support portion is coaxial with the first rotary axis; and a spherical center of the second support portion is located on the axis of the first support portion.

3. The oscillating-drive mechanism for the massager according to claim 1, wherein the first support portion is made of a flexible material, and the first support portion is connected to a circumferential wall surface of the oscillating arm; and when the oscillating arm is subjected to force, the first support portion is deformed to provide motion clearance for the oscillating arm.

4. The oscillating-drive mechanism for the massager according to claim 1, wherein the first support portion is configured as a plate structure and is provided with a circular hole penetrating the plate structure, and an axis of the circular hole is coaxial with the output shaft of the motor;

a portion of the oscillating arm located in the circular hole is a cylindrical structure;

$$L1 \leq \sqrt{3} \times L2,$$

wherein L1 is a maximum distance between the circular hole and a circumferential wall surface of the cylindrical structure, and L2 is a depth of the circular hole.

5. The oscillating-drive mechanism for the massager according to claim 1, wherein the oscillating arm is divided into three sections in a length direction, the three sections are a first rigid section, an elastic section, and a second rigid section in sequence; and the three sections are aligned in a straight line when the elastic section is in an unstressed state; and when the first rigid section and the second rigid section are subjected to force exceeding a predetermined resistance, the elastic section is deformed to cause the oscillating arm to bend.

6. The oscillating-drive mechanism for the massager according to claim 1, wherein the transmission member further comprises a first mounting plate, and the first mounting plate is configured to fixedly connect the first transmission portion and the second transmission portion.

7. The oscillating-drive mechanism for the massager according to claim 6, wherein the third transmission portion is configured as a circular hole formed from the end of the oscillating arm in a length direction of the oscillating arm;

the second transmission portion is configured as a shaft structure protruding from the first mounting plate; and the second transmission portion is inserted into the third transmission portion and abuts against a circumferential wall surface of the third transmission portion, wherein the length direction of the oscillating arm is not parallel to the output shaft of the motor.

8. The oscillating-drive mechanism for the massager according to claim 6, wherein the third transmission portion is configured as a cylindrical body extending from the end of the oscillating arm in a length direction of the oscillating arm; and the second transmission portion is configured as a circular hole structure recessed in the first mounting plate; and the third transmission portion is arranged obliquely in the second transmission portion relative to the axis of the second transmission portion.

9. The oscillating-drive mechanism for the massager according to claim 1, wherein the second transmission portion is configured as a slot structure;

the slot structure comprises at least two wall surfaces forming an opening oriented in a direction away from the first rotary axis;

the third transmission portion is configured as a cylindrical body extending from the end of the oscillating arm in a length direction of the oscillating arm; and the third transmission portion is arranged at the opening of the slot structure, and the at least two wall surfaces of the slot structure drive the third transmission portion to rotate about the first rotary axis, causing the length direction of the oscillating arm to be non-parallel to the output shaft of the motor.

10. The oscillating-drive mechanism for the massager according to claim 1, wherein a ball bearing structure is arranged between the third transmission portion and the second transmission portion to generate rolling friction between the third transmission portion and the second transmission portion.

11. The oscillating-drive mechanism for the massager according to claim 10, wherein the ball bearing structure is a sphere, and the sphere abuts against the oscillating arm.

12. The oscillating-drive mechanism for the massager according to claim 10, wherein the ball bearing structure is a bearing, and the bearing abuts against the oscillating arm.

13. The oscillating-drive mechanism for the massager according to claim 6, wherein the support member is configured as a cylindrical structure, a first guide hole is formed on an inner wall of the support member, and an axis of the first guide hole is parallel to the first rotary axis;

the first mounting plate is circular, and an axis of the first transmission member is coaxial with the first mounting plate; and the first mounting plate is rotatably connected in the first guide hole.

14. The oscillating-drive mechanism for the massager according to claim 2, wherein the oscillating arm is provided with a limiting portion protruding in a circumferential direction of the oscillating arm, the oscillating arm extends through the second support portion, and the second support portion is positioned between the limiting portion and the plurality of support points.

15. The oscillating-drive mechanism for the massager according to claim 2, wherein the second support portion is detachably connected to the oscillating arm; and the second support portion is an annular structure.

16. The oscillating-drive mechanism for the massager according to claim 1, wherein a rear end face of the support member is configured as a second mounting plate, and the second mounting plate is detachably fixed to a main body of the support member.

17. The oscillating-drive mechanism for the massager according to claim 1, wherein a front end of the oscillating arm is configured as a support body for supporting a flexible layer, and a functional module is arranged inside the support body.

18. The oscillating-drive mechanism for the massager according to claim 17, wherein the functional module has a vibration function and/or a heating function.

19. The oscillating-drive mechanism for the massager according to claim 1, wherein the motor is connected to a reduction gearbox.

* * * * *